United States Patent
Kwon et al.

(10) Patent No.: US 8,797,984 B2
(45) Date of Patent: Aug. 5, 2014

(54) SIGNAL TRANSMITTING AND RECEIVING METHOD OF REPEATER AND REPEATER USING THE SAME

(75) Inventors: Yeong Hyeon Kwon, Anyang-si (KR); Kyu Jin Park, Anyang-si (KR); Sung Ho Moon, Anyang-si (KR); Seung Hee Han, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 190 days.

(21) Appl. No.: 13/382,144

(22) PCT Filed: Jul. 1, 2010

(86) PCT No.: PCT/KR2010/004282
§ 371 (c)(1),
(2), (4) Date: Jan. 3, 2012

(87) PCT Pub. No.: WO2011/002243
PCT Pub. Date: Jan. 6, 2011

(65) Prior Publication Data
US 2012/0099520 A1    Apr. 26, 2012

Related U.S. Application Data

(60) Provisional application No. 61/222,488, filed on Jul. 2, 2009.

(51) Int. Cl.
*H04W 4/00* (2009.01)
*H04W 72/04* (2009.01)

(52) U.S. Cl.
CPC ........ *H04W 72/042* (2013.01); *H04W 72/0406* (2013.01); *H04W 72/04* (2013.01)
USPC ............................ 370/329; 370/330; 370/328

(58) Field of Classification Search
CPC .......... H04W 72/042; H04W 72/0446; H04W 72/0044; H04W 72/044; H04W 72/0406; H04W 72/04; H04W 72/00; H04L 5/0007; H04L 5/0005; H04L 5/0003; H04J 11/00
USPC ........ 370/201, 203, 206, 210, 216, 230, 241, 370/252, 254, 280, 311, 312, 315, 328, 329, 370/330, 331, 336, 350; 455/422.1, 436, 455/450, 452.1, 501, 509, 517, 522, 63.1, 455/68
See application file for complete search history.

(56) References Cited

U.S. PATENT DOCUMENTS

2008/0070582 A1    3/2008   Cai

FOREIGN PATENT DOCUMENTS

WO    WO 2010/057521 A1 *    5/2010    ............ H04W 16/26

OTHER PUBLICATIONS

3GPP TR 36.814 (v0.4.1), "Further Advancements for E-UTRA Physical Layer Aspects", Feb. 2009, 3GPP, all pages.*

(Continued)

*Primary Examiner* — Kwang B Yao
*Assistant Examiner* — Adam Duda
(74) *Attorney, Agent, or Firm* — Lee, Hong, Degerman, Kang & Waimey

(57) ABSTRACT

The present invention relates to a method for a repeater to transmit and receive a signal on a downlink sub frame in a wireless communication system, comprising the steps of: transmitting a first physical downlink control channel (PDCCH) to terminals positioned within a repeater cell on a downlink sub frame; and receiving a second PDCCH or a physical downlink shared channel (PDSCH) from a base station after a first guard time succeeding a first PDCCH section elapses, wherein a second guard time succeeding the PDSCH or the second PDCCH received from the base station is allocated to the downlink sub frame, and the repeater receives the second PDCCH through a certain range of symbols in accordance with information on the predetermined control channel section, which is received from the base station.

16 Claims, 16 Drawing Sheets

(56) References Cited

OTHER PUBLICATIONS

3GPP TR 36.814 (v1.5.0), "Further Advancements for E-UTRA Physical Layer Aspects", Nov. 2009, 3GPP, all pages.*

R1-084357, "Efficient Support of Relays Through MBSFN Subframes", Nov. 2008, 3GPP, all pages.*

R1-084515, "Comparing Relay Support with MBSFN and Blank Subframes", Nov. 2008, 3GPP, all pages.*

R1-090153, "Control Channel and Data Channel Design for Relay Link in LTE-Advanced", Jan. 2009, 3GPP, all pages.*

R1-090641, "Control Signaling Structures for Relay Link", Feb. 2009, 3GPP, all pages.*

R1-090753, "Control Channel and Data Channel Design for Relay Link in LTE-Advanced", Feb. 2009, all pages.*

R1-091049, "Preference for Relay Operation in LTE-A", Feb. 2009, 3GPP, all pages.*

LG Electronics, "Resource Allocation and Downlink Control Channel Structure for Relay Backhaul Link", R1-091194, 3GPP TSG RAN WG1 Meeting #56bis, Mar. 2009.

Nokia et al., "Text proposal on backhaul resource assignment", R1-092249, 3GPP TSG RAN WG1 Meeting #57, May 2009.

* cited by examiner

GUARD TIME (FRACTIONAL OFDM SYMBOL LENGTH)

(a)

GUARD TIME (INTEGER OFDM SYMBOL LENGTH)

(b)

(a)

(b)

(c)

(a)

(b)

SIMPLE SUBFRAME CONCATENATION (a)

(b)

(c)

(a)

(b)

SIGNAL TRANSMITTING AND RECEIVING METHOD OF REPEATER AND REPEATER USING THE SAME

CROSS-REFERENCE TO RELATED APPLICATIONS

This application is the National Stage filing under 35 U.S.C. 371 of International Application No. PCT/KR2010/004282, filed on Jul. 1, 2010, which claims the benefit of U.S. Provisional Application Serial No. 61/222,488, filed on Jul. 2, 2009, the contents of which are all incorporated by reference herein in their entirety.

TECHNICAL FIELD

The present invention relates to a wireless communication system, and more particularly, to a method for transmitting and receiving signals at a Relay Node (RN).

BACKGROUND ART

When the channel state between an evolved Node B (eNB) and a User Equipment (UE) is poor, an RN may be installed between them to thereby provide a radio channel in a better channel state to the UE. In addition, with the introduction of an RN at a cell edge suffering a poor channel state from an eNB, a higher-rate data channel can be provided and cell coverage can be extended. The use of RNs is a widely used technology aiming to eliminate shadowing areas in wireless communication systems.

Compared to a conventional relay technology confined to the function of a repeater that simply amplifies a signal and forwards the amplified signal, the recent relay technology is more advanced. Further, the relay technology is essential to extend service coverage and increase data throughput as well as to reduce eNB installation cost and backhaul maintenance cost. Along with the development of the relay technology, RNs used in legacy wireless communication systems need to be supported in new wireless communication systems.

As an RN functions to forward a link connection between an eNB and a UE in a $3^{rd}$ Generation Partnership Project Long Term Evolution (3GPP LTE) system, two types of links having different characteristics are applied to each of uplink and downlink carrier frequency bands. A link established between the eNB and the RN is referred to as a backhaul link. When the backhaul link occupies downlink resources for Frequency Division Duplex (FDD) or Time Division Duplex (TDD) transmission, it is referred to as a backhaul downlink, whereas when the backhaul link occupies uplink resources for FDD or TDD transmission, it is referred to as a backhaul uplink.

To support relay-related link configurations, each of a legacy eNB and a legacy UE has one of a transmission module and a reception module for each of the uplink and the downlink. On the other hand, the RN needs to have both transmission and reception modules for each of the downlink and uplink.

Thus, the RN can transmit a signal to the eNB and receive a signal from the UE on the uplink. The RN can also receive a signal from the eNB and transmit a signal to the UE on the downlink. However, if the RN performs signal transmission and reception simultaneously, much interference and errors occur in many cases. Therefore, simultaneous transmission and reception at the RN is not preferred.

Accordingly, an appropriate timing is needed for the RN to exchange signals with the eNB and the UE. Nevertheless, no frame structure designed for signal exchange between an RN and an eNB and between the RN and a UE has been specified yet.

DISCLOSURE

Technical Problem

An object of the present invention devised to solve the conventional problem is to provide a method for transmitting and receiving signals at an RN.

Another object of the present invention is to provide an RN apparatus for transmitting and receiving signals.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting and receiving a signal in a downlink subframe at a relay in a wireless communication system includes transmitting a first Physical Downlink Control CHannel (PDCCH) in a downlink subframe to User Equipments (UEs) within a relay cell, and receiving a second PDCCH or a Physical Downlink Shared CHannel (PDSCH) from a Base Station (BS) after a first guard time following the first PDCCH. A second guard time is allocated after the second PDCCH or the PDSCH received from the BS in the downlink subframe and the relay receives the second PDCCH in a predetermined number of symbols according to specific control channel region information received from the BS.

If the specific control channel region information includes information about a maximum or minimum length of the second PDCCH transmitted by the BS, the relay may transmit and receive a signal in remaining symbols except for the predetermined number of symbols indicated by the specific control channel region information.

The specific control channel region information may include information about a fixed region length set by the BS.

The specific channel region information may be set by the BS and received in an arbitrary downlink subframe ahead of the downlink subframe in which the relay receives the second PDCCH from the BS.

The first PDCCH may be transmitted after the sum of a time corresponding to a propagation delay from the start of the downlink subframe and a time corresponding to a specific number of delay symbols.

If each of the first and second guard times is a 0.5 symbol, the predetermined number of delay symbols may be 0.5.

Each of the first and second guard times may be a 0.5 symbol or one or more symbols.

A predetermined number of symbols may be set as a guard band to distinguish a relay resource region used for the relay to transmit and receive the first PDCCH, the second PDCCH, and the PDSCH from a BS resource region used for the BS to transmit a downlink signal to UEs within a cell in a total system resource region.

The guard band may be a symbol at least one of both ends of the relay resource region.

If the relay resource region is divided into resource regions for a plurality of relays, the relay resource region may further include a plurality of guard bands to distinguish the resource regions for the plurality of relays from one another.

In another aspect of the present invention, a method for transmitting and receiving a signal in a backhaul uplink subframe at a relay in a wireless communication system includes transmitting at least one of a Physical Downlink Control CHannel (PDCCH), a Physical Downlink Shared CHannel (PDSCH), and a Sounding Reference Signal (SRS) in a backhaul uplink subframe after a first guard time. A second guard time is selectively allocated in a last symbol of the backhaul uplink subframe, and each of the first and second guard times is a fractional symbol or one or more symbols.

If each of the first and second guard times is a 0.5 symbol, the predetermined number of delay symbols may be 0.5.

The method may further include receiving SRSs in a specific symbol of the backhaul uplink subframe from one or more User Equipments (UEs) within a relay cell, and the specific symbol used to receive the SRSs from the UEs may be set as the second guard time. Herein, at least one of the PDCCH, PDSCH, and SRS may be allocated to 12 or 13 symbols.

The first guard time may be set after a specific number of delay symbols, advanced from the start of the backhaul uplink subframe by a time corresponding to a propagation delay.

A predetermined number of symbols may be set as a guard band to distinguish a relay resource region used for the relay to transmit at least one of the PDCCH, the PDSCH, and the SRS from a UE resource region used for a UE to transmit an uplink signal to the BS or the relay. The guard band may be a symbol at least one of both ends of the relay resource region.

If the relay resource region is divided into resource regions for a plurality of relays, the relay resource region may further include a plurality of guard bands to distinguish the resource regions for the plurality of relays from one another.

In another aspect of the present invention, a relay for transmitting and receiving a signal in a downlink subframe in a wireless communication includes a reception module for receiving a radio signal in a downlink subframe, a transmission module for transmitting a first Physical Downlink Control CHannel (PDCCH) in the downlink subframe to User Equipments (UEs) within a relay cell, and a processor for receiving a second PDCCH or a Physical Downlink Shared CHannel (PDSCH) from a Base Station (BS) through the reception module after a first guard time following the first PDCCH. The processor allocates a second guard time after the second PDCCH or the PDSCH received from the BS in the downlink subframe and receives the second PDCCH in a predetermined number of symbols through the reception module according to specific control channel region information received from the BS.

If the specific control channel region information includes information about a maximum or minimum length of the second PDCCH transmitted by the BS, the processor may transmit and receive a signal in remaining symbols except for the predetermined number of symbols indicated by the specific control channel region information, through the transmission module and the reception module.

The reception module may receive the specific channel region information in an arbitrary downlink subframe ahead of the downlink subframe in which the reception module receives the second PDCCH from the BS.

The reception module may receive the first PDCCH after the sum of a time corresponding to a propagation delay from the start of the downlink subframe and a time corresponding to a specific number of delay symbols.

The processor may sets a predetermined number of symbols as a guard band to distinguish a relay resource region used for the relay to transmit and receive the first PDCCH, the second PDCCH, and the PDSCH from a BS resource region used for the BS to transmit a downlink signal to UEs within a cell in a total system resource region.

If the relay resource region is divided into resource regions for a plurality of relays, the processor may further set a plurality of guard bands to distinguish the resource regions for the plurality of relays from one another.

In a further aspect of the present invention, a relay for transmitting and receiving a signal in a backhaul uplink subframe in a wireless communication system includes a transmission module for transmitting at least one of a Physical Downlink Control CHannel (PDCCH), a Physical Downlink Shared CHannel (PDSCH), and a Sounding Reference Signal (SRS) in a backhaul uplink subframe after a first guard time, and a processor for selectively allocating a second guard time in a last symbol of the backhaul uplink subframe. Each of the first and second guard times is a fractional symbol or one or more symbols.

The relay may further include a reception module for receiving a radio signal. If the reception module may receive SRSs in a specific symbol of the backhaul uplink subframe from one or more User Equipments (UEs) within a relay cell, the processor may use the specific symbol used to receive the SRSs from the UEs as the second guard time.

The processor may set the first guard time after a specific number of delay symbols, advanced from the start of the backhaul uplink subframe by a time corresponding to a propagation delay.

The embodiments of the present invention are merely a part of preferred embodiments of the present invention and those skilled in the art can derive and understand various embodiments reflecting the technical features of the present invention from the detailed description of the present invention.

Advantageous Effects

According to the transmission and reception method of an RN according to the present invention, the RN can transmit and receive signals in accurate timing synchronization with an eNB. Therefore, the efficiency and accuracy of signal transmission can be increased.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to one of $3^{rd}$ Generation partnership Project Long Term Evolution (3GPP LTE) series of standards is being used. However, the description is applicable to any other mobile communication system except for specific features inherent to the 3GPP LTE series of standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), or an Advanced Mobile Station (AMS). In addition, the term Base Station (BS) generically refers to any node at a network end which communicates with a UE, such as a Node B, an evolved Node B (eNode B), an Access Point (AP), etc.

In a mobile communication system, a UE can receive information from an eNB on a downlink and transmit data to the eNB on an uplink. Information transmitted from or received at the UE includes data and various types of control information. There are many physical channels depending on the types and usages of information transmitted from or received at UEs.

Figure 1:
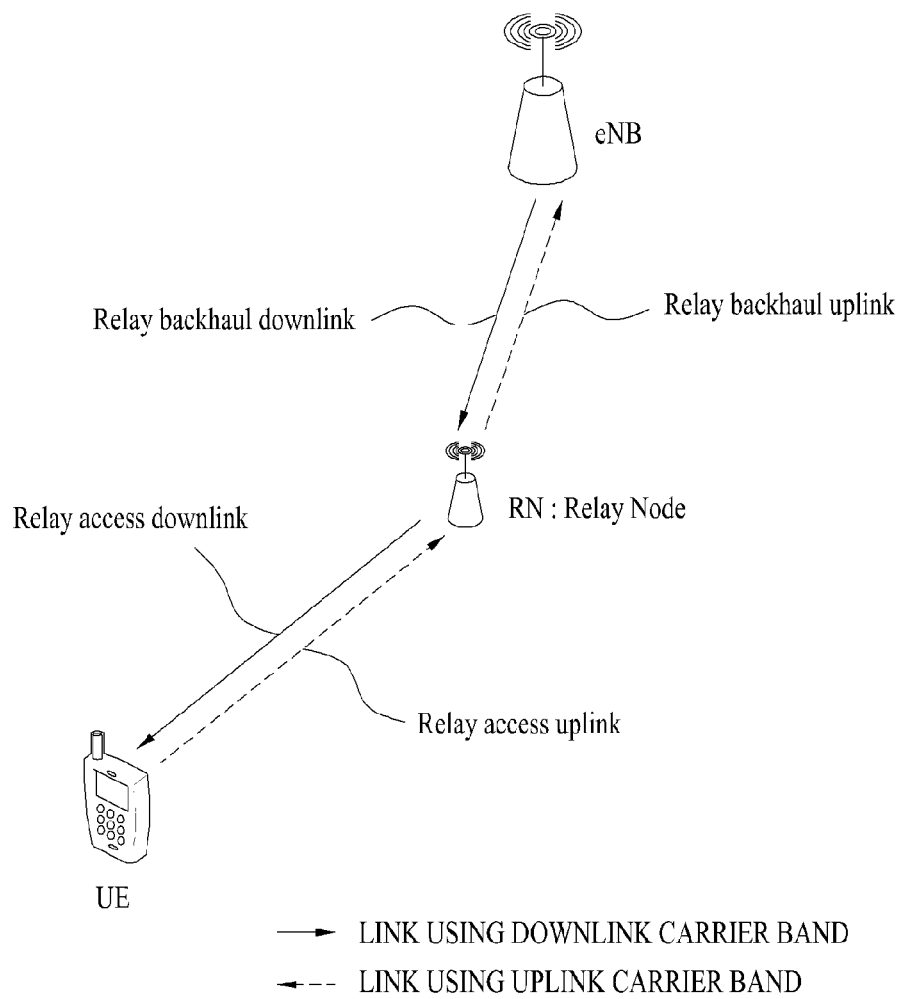
FIG. 1 illustrates the configuration of a relay backhaul link and a relay access link in a wireless communication system.

FIG. 1 illustrates the configuration of a relay backhaul link and a relay access link in a wireless communication system.

Referring to FIG. 1, a Relay Node (RN) may receive information from an eNB on a relay backhaul downlink and transmit information to the eNB on a relay backhaul uplink. In addition, the RN may transmit information to a UE on a relay access downlink and receive information from the UE on a relay access uplink.

The RN may perform initial cell search including acquisition of synchronization to the eNB. For the initial cell search, the RN may receive a synchronization channel from the eNB and then may synchronize its timing to the eNB and acquire a cell Identifier (ID) from the received synchronization channel. Subsequently, the RN may receive a physical broadcast channel from the eNB and acquire broadcast information of a cell from the received physical broadcast channel. Meanwhile, the RN may receive a relay backhaul downlink reference signal and determine the channel state of the relay backhaul downlink from the relay backhaul downlink reference signal during the initial cell search. The RN may acquire more detailed system information by receiving a Physical Downlink Control CHannel (PDCCH) (or a Relay-Physical Downlink Control CHannel (R-PDCCH)) and a Physical Downlink Shared CHannel (PDSCH) (or a Relay-Physical Downlink Shared CHannel (R-PDSCH)) indicated by information carried on the PDCCH.

If the RN initially accesses the eNB or has no radio resources for signal transmission to the eNB, the RN may perform a random access procedure with the eNB. In the random access procedure, the RN may transmit a specific sequence as a preamble on a Physical Random Access CHannel (PRACH) and receive a random access response message on an R-PDCCH and an R-PDSCH associated with the R-PDCCH. In the case of contention-based random access except handover, a contention resolution procedure may be performed, including transmission of an additional PRACH and reception of an additional R-PDCCH/R-PDSCH.

After the above-described procedure, the RN may receive an R-PDCCH/R-PDSCH and transmit a Relay-Physical Uplink Shared Channel (R-PDSCH)/Relay-Physical Uplink Control Channel (R-PDCCH) in a general uplink/downlink signal transmission procedure. Control information that the RN transmits to the eNB on the uplink or the eNB receives from the RN on the uplink may include a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the RN may transmit control information such as a CQI, a PMI, an RI, etc. on the R-PUSCH/R-PUCCH.

Figure 2:
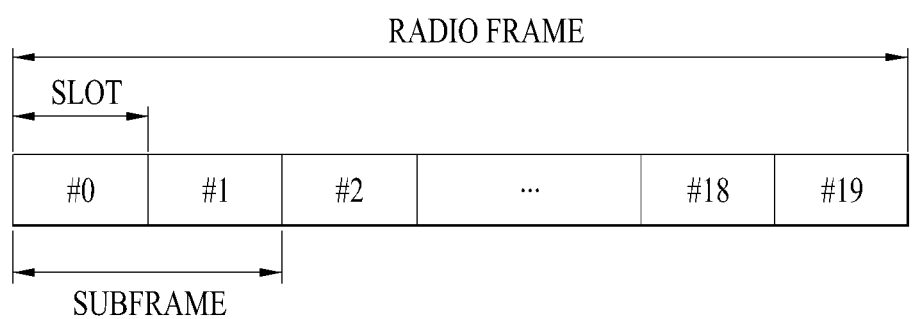
FIG. 2 illustrates a frame structure in a $3^{rd}$ Generation Partnership Project Long Term Evolution (3GPP LTE) system as an example of a mobile communication system.

FIG. 2 illustrates a radio frame structure in the 3GPP LTE system as an example of a mobile communication system.

Referring to FIG. 2, one radio frame may be divided into 10 subframes, each subframe including two slots in the time domain. The transmission time of one subframe is defined as a Transmission Time Interval (TTI). For example, one subframe may be 1 ms long and one slot may be 0.5 ms long. One slot may include a plurality of Orthogonal Frequency Division Multiplexing (OFDM) symbols in the time domain.

Because the 3GPP LTE system uses Orthogonal Frequency Division Multiple Access (OFDMA) for downlink, an OFDM symbol may represent one symbol period. An OFDM symbol may be regarded as a Single Carrier-Frequency Division Multiple Access (SC-FDMA) symbol or symbol period for uplink. A Resource Block (RB) is a resource allocation unit including a plurality of contiguous subcarriers in one slot. For example, one radio frame may include 10 subframes, one subframe may include 2 slots, and one slot may include 7 OFDM symbols. However, the number of subframes, the number of slots, and the number of OFDM symbols may vary. For simplicity of description, the following description is given on the assumption that 14 OFDM symbols are included in one subframe.

As described before, the RN needs both a transmission module and a reception module for each of the downlink and uplink, as illustrated in Table 1.

TABLE 1

| Function | eNB | RN | UE |
| --- | --- | --- | --- |
| Downlink transmission | ◯ | ◯ | X |
| Downlink reception | X | ◯ | ◯ |
| Uplink transmission | X | ◯ | ◯ |
| Uplink reception | ◯ | ◯ | X |

Referring to Table 1, the eNB needs only a reception module for the uplink and only a transmission module for the downlink and the UE needs only a transmission module for the uplink and only a reception module for the downlink. That is, each of the UE and the eNB needs only a transmission module or a reception module for each of the uplink and downlink.

However, because the RN relays a signal received from the eNB to the UE and a signal received from the UE to the eNB, the RN needs both a transmission module and a reception module for each of the downlink and uplink.

When a wireless backhaul is defined for the operation of an RN, use of resources in units of a subframe may be defined in Time Division Multiplexing (TDM). One or more subframes may be available to the RN and the RN may use resources compatibly with the backhaul. Since the RN can perform both transmission and reception in view of its nature, it is preferred that the RN transmits and receives signals in the same band.

For example, the RN may transmit control information and/or data to its served UEs and receive control information and/or data from the eNB at a specific time, in a downlink band in which a macro eNB transmits downlink signals to UEs. Herein, the RN should transmit mandatory channels to the served UEs and later, the RN may be placed in a situation where it should communicate with the eNB. Preferably, the RN prepares for downlink traffic transmission to the served UEs before a corresponding subframe starts.

In another example, the RN may use a specific subframe to communicate with the eNB on the uplink during uplink reception from a UE. In this case, the RN may have to transmit a signal to the eNB, simultaneously with reception of control information and/or data from the UE in the subframe.

When transmission and reception occur simultaneously in a single subframe, it is necessary to allocate an OFDM symbol included in the subframe as a Guard Time (GT) for Radio Frequency (RF) switching (switching between a transmission mode and a reception mode at the RN). The GT is interchangeably used with a transition time gap required for switching between the transmission mode and the reception mode in the same subframe.

Therefore, when systems of different versions co-exist as is the case with an LTE/LTE-Advanced (LTE-A) system added with RNs, the present invention is intended to provide a method for setting a GT to mitigate interference between signals in one or more subframes.

In configuring an LTE-A system, a Multimedia Broadcast Single Frequency Network (MBSFN) subframe may be defined on downlink to support RNs. UEs served by an RN may commonly receive a PDCCH from an eNB directly or through the RN in an area of the MBSFN subframe and may operate differently according to their capabilities in the remaining area of the MBSFN subframe. On the other hand, the RN may transmit a PDCCH to UEs in its relay cell in some OFDM symbols of the MBSFN subframe and communicate with the eNB in the other OFDM symbols of the MBSFN subframe.

Figure 3:
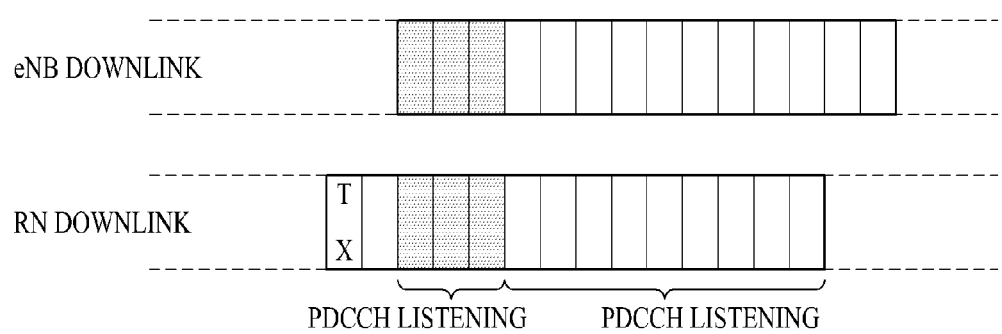
FIG. 3 illustrates an exemplary structure of symbols allocated for transmitting a Relay-Physical Downlink Control CHannel (R-PDCCH) and a Relay-Physical Downlink Shared CHannel (R-PDSCH) in a backhaul downlink subframe for an evolved Node B (eNB) and an exemplary structure of a Multimedia Broadcast Single Frequency Network (MBSFN) subframe for a Relay Node (RN)

FIG. 3 illustrates an exemplary structure of symbols allocated for transmitting an R-PDCCH and an R-PDSCH in a backhaul downlink subframe for an eNB and an exemplary structure of an MBSFN subframe for an RN.

Referring to FIG. 3, the timing of an RN downlink subframe may be set to be different from the reception timing of an eNB downlink subframe at the RN. In case of timing shift, the subframe of the RN may be advanced from the subframe of the eNB, as illustrated in FIG. 3. In this specification, timing shift may refer to symbol shift or time shift. In this case, after the RN transmits an R-PDCCH to a plurality of UEs within its relay cell, it may read a PDCCH received from the eNB. Therefore, the PDCCH used in the legacy system may still be used for the RN.

Unlike FIG. 3, a timing lag may be applied to the RN subframe. In this case, a comparison between the boundary of the eNB downlink subframe and the boundary of the RN downlink subframe tells that the boundary of the RN subframe lags behind the boundary of the eNB subframe and the RN should set two contiguous downlink subframes as MBSFN subframes. As the RN can read the other PDCCH except in the first subframe, the PDCCH can be reused but successive downlink subframes should be set as MBSFN subframes.

If a timing shift is used between an eNB subframe and an RN subframe, the timing shift value may be set to an integer multiple of an OFDM symbol length.

However, to maximize the number of OFDM symbols for data transmission, an OFDM symbol fraction may be used for a timing shift in accordance with an embodiment of the present invention.

Figure 4:
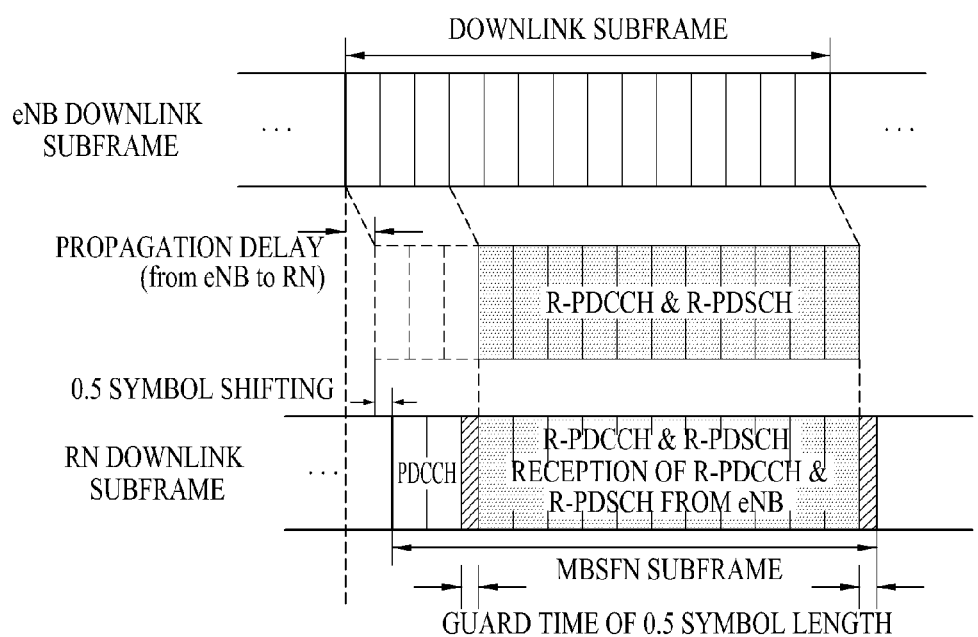
FIG. 4 illustrates an exemplary structure of symbols allocated for transmitting an R-PDCCH and an R-PDSCH in an eNB backhaul downlink subframe and an exemplary structure of an MBSFN subframe of an RN according to an embodiment of the present invention.

FIG. 4 illustrates an exemplary structure of symbols allocated for transmitting an R-PDCCH and an R-PDSCH in an eNB backhaul downlink subframe and an exemplary structure of an MBSFN subframe of an RN according to an embodiment of the present invention.

Specifically, FIG. 4 illustrates an example of fractional OFDM symbol shifting from the viewpoint of DL/UL subframes for the backhaul link and access link of an eNB and an RN, taking into account a propagation delay $T_p$ according to the distance between the eNB and the RN.

The eNB may allocate 3 OFDM symbols of a backhaul downlink subframe to a PDCCH directed to UEs within a macrocell and the remaining 11 OFDM symbols to a PDSCH for a UE within the macrocell and an R-PDCCH and an R-PDSCH for the RN.

The propagation delay $T_p$ is generated when the donor eNB transmits the PDCCH to UEs within the macrocell or an R-PDCCH and an R-PDSCH to the RN. For example, as long a propagation delay as one OFDM symbol may be generated as illustrated in FIG. 4. Herein, the eNB may set the timing of an MBSFN subframe used by the RN so that the MBSFN subframe timing is aligned with the reception timing of the backhaul subframe of the eNB, taking into account a GT. This will be described later in relation to GT setting.

Then, an OFDM symbol fraction following the PDCCH may be allocated as a GT for RF switching (switching between the transmission mode and the reception mode at the RN). That is, after transmitting a PDCCH to UEs within the relay cell in the MBSFN subframe in the transmission mode, the RN needs an RF switching time to switch to the reception mode in which it receives an R-PDCCH or R-PDSCH from the eNB. Compared to a conventional scheme in which an integer number of OFDM symbols are allocated as a GT, an OFDM symbol fraction (e.g. a 0.5 OFDM symbol) may be allocated to a GT and the GT may be set at a time requiring RF switching and at the last of an MBSFN subframe in the embodiment of the present invention.

If one OFDM symbol is divided into two 0.5 OFDM symbols and a 0.5-OFDM symbol is allocated as a GT, the timing of the RN downlink subframe may be shifted by a 0.5 OFDM symbol to be aligned with the timing of the eNB downlink subframe. That is, an OFDM symbol timing at which the RN receives the R-PDCCH and the R-PDSCH from the eNB may be aligned with the transmission symbol timing of the eNB by allowing the relay to transmit the PDCCH to UEs within the relay cell after a time period corresponding to the sum of a propagation delay (e.g. one OFDM symbol) from the time of transmitting the PDCCH to UEs within the macrocell by the eNB and a symbol shift (e.g. a 0.5 OFDM symbol).

Therefore, the RN may allocate two OFDM symbols for PDCCH transmission in the MBSFN subframe, one OFDM symbol fraction to a GT, and receive the R-PDCCH and an R-PDSCH in the remaining 11 OFDM symbols from the eNB.

When a timing shift is performed between the downlink of the eNB and the downlink of the RN, it may be difficult to use macro diversity or multipoint transmission through the eNB and the RN. Thus, it is preferred to align the boundary of an eNB downlink subframe with the boundary of an RN downlink subframe, as illustrated in FIG. 4.

However, if the timing of an eNB downlink subframe is identical to the reception timing of an RN downlink subframe, the RN may not read a PDCCH received from the eNB in a subframe that the RN has set as an MBSFN subframe, while transmitting a PDCCH. In addition, the RN may not know a subframe length carrying the PDCCH in the corresponding subframe.

Therefore, information about the number of OFDM symbols (or a subframe length) allocated to a PDCCH that an RN transmits to UEs within its relay cell in an RN downlink subframe may be set according to a predetermined rule, or set and signaled to the RN by an eNB in accordance with an embodiment of the present invention.

Firstly, on the assumption that the length of a control channel in a subframe used for communication with an RN by an eNB is a maximum/minimum value (e.g. 3/1 OFDM symbol), the remaining symbols of the subframe may be used to transmit control information and/or data.

Secondly, the length of a control channel in a subframe used for communication with an RN by an eNB may be fixed to a specific number of OFDM symbols. For example, in the case where a fixed number of OFDM symbols are allocated to a PDCCH according to the number of transmission antennas, two OFDM symbols may be set for three or more transmission antennas and one OFDM symbol may be set for two or fewer transmission antennas.

Thirdly, the length of a control channel used in a subframe used for communication with an $n^{th}$ RN by an eNB may be signaled during a communication period set for communicating with the previous RN, an $m^{th}$ ($m \le n-1$) RN. Only when determining that all RNs communicating with the eNB in a corresponding subframe share PDCCH length information (e.g. upon receipt of an ACK signal for PDCCH length change information from all RNs), the eNB may consider changing the PDCCH length.

Figure 5:
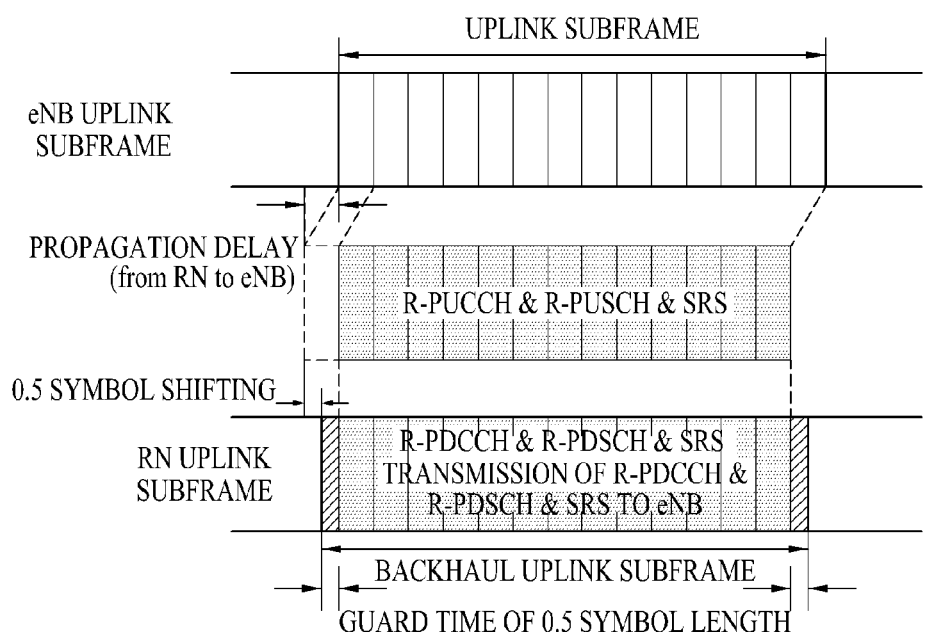
FIGS. 5 and 6 illustrate exemplary structures of symbols allocated for receiving a Relay-Physical Uplink Control CHannel (R-PUCCH) and a Relay-Physical Uplink Shared CHannel (R-PUSCH) in an eNB uplink subframe and exemplary structures of an RN backhaul uplink subframe according to embodiments of the present invention.
Figure 6:
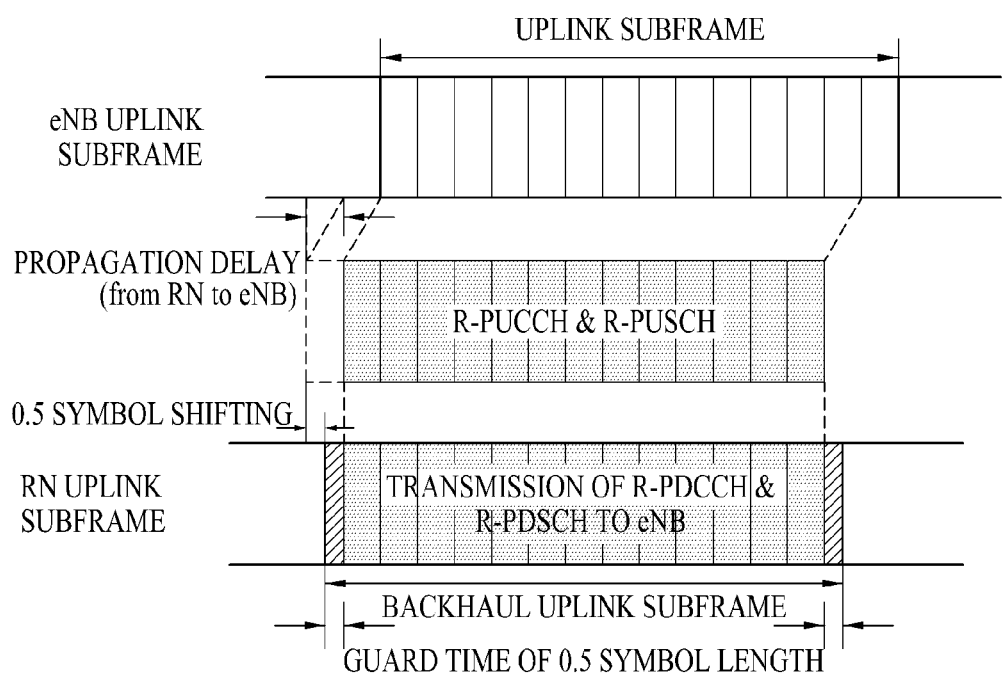

FIGS. 5 and 6 illustrate exemplary structures of symbols allocated for receiving an R-PUCCH and an R-PUSCH in an eNB uplink subframe and exemplary structures of an RN backhaul uplink subframe according to embodiments of the present invention.

The eNB needs to estimate the channel qualities of backhaul uplink channels. For channel quality estimation, an RN may transmit a Sounding Reference Signal (SRS) to the eNB during a time period available for backhaul uplink transmission. The RN may transmit the SRS in the last SC-FDMA symbol of an uplink subframe to the eNB and the eNB may receive the SRS from the RN in the last symbol of the uplink subframe. Alternatively, the RN may transmit the SRS in a symbol of a subframe other than the corresponding subframe.

Symbols available for transmission of an R-PUCCH, an R-PUSCH, and an SRS in an RN uplink subframe may be determined according to a GT required for RF switching at the RN. Referring to FIGS. 5 and 6, a 0.5 SC-FDMA symbol may be allocated to a GT in accordance with an embodiment of the present invention.

Therefore, the timing of the backhaul uplink subframe transmitted from the RN may be advanced from the reception timing of the uplink subframe at the eNB by a 0.5-SC-FDMA symbol. This corresponds to a case where the uplink frame timing of the RN is synchronized to the sum of the 0.5-symbol length and an uplink timing advance value adjusted during the RACH procedure of the donor eNB.

Thus, the RN may set 0.5 SC-FDMA symbols as GTs before and after the backhaul uplink subframe and allocate 13 SC-FDMA symbols for transmission of the R-PUCCH, the R-PUSCH, and the SRS.

As long a propagation delay as one SC-FDMA symbol may also occur when the RN transmits the R-PUCCH, R-PUSCH, and SRS to the eNB. As a result, the symbol timing at which the RN transmits an uplink signal may be identical to the timing of the second symbol in the uplink subframe of the eNB.

Referring to FIG. 6, the symbol timing of a backhaul uplink subframe used by the RN may be aligned with the start of an uplink subframe of the eNB in accordance with another embodiment of the present invention.

Figure 7:
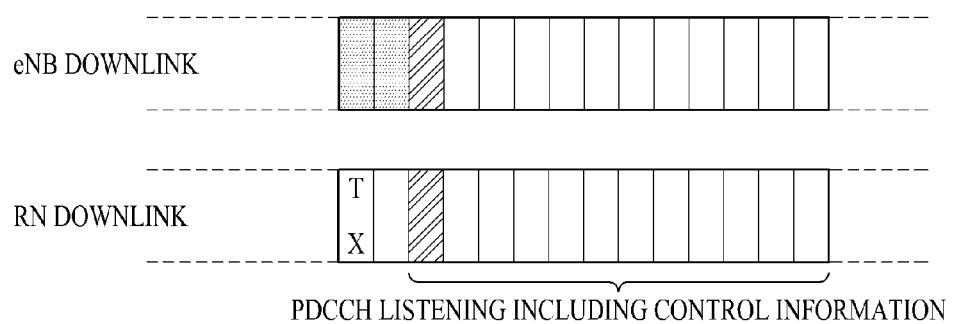
FIG. 7 illustrates another exemplary structure of symbols allocated for transmitting an R-PDCCH and an R-PDSCH in an eNB backhaul downlink subframe and another exemplary structure of a MBSFN subframe of an RN.

FIG. 7 illustrates another exemplary structure of symbols allocated for transmitting an R-PDCCH and an R-PDSCH in an eNB backhaul downlink subframe and another exemplary structure of a MBSFN subframe of an RN.

Specifically, FIG. 7 illustrates a case where the timing of an eNB backhaul downlink subframe is aligned with the timing of an RN downlink subframe. In this case, the RN cannot read a PDCCH received from the eNB in the downlink subframe used by the RN. Thus, the RN may use the PDCCH length setting method described before with reference to FIG. 4.

FIGS. 3 to 6 and FIG. 7 illustrate exemplary subframes in case of a normal Cyclic Prefix (CP), which are true to other CP lengths.

Especially, if the length of OFDM symbols carrying downlink control channels is different from the length of the other OFDM symbols, the eNB and the RN preferably use the same CP in the downlink control channel part.

On the other hand, there is no need for applying the same CP length to shared channels. That is, a Guard Band (GB) may be inserted into a subframe without setting a CP used in transmitting a downlink signal from the eNB to UEs within the macrocell to be equal to a CP used in transmitting a downlink signal from the eNB to the RN.

Meanwhile, strong constraints regarding subframe configuration for control channels are not imposed on the uplink, compared to the downlink. Further, the eNB and the RN may negotiate SC-FDMA symbols available in a subframe.

However, UEs within the relay cell and UEs within the macrocell served by the eNB may differ in their uplink transmission timing. That is, since the RN should transmit a signal to the eNB in an uplink subframe after receiving uplink traffic from a served UE, the uplink timing of UEs within the relay cell may be set to be advanced so that the RN may transmit an uplink signal to the eNB at the moment the RN completely receives an uplink signal from the served UE.

According to an embodiment of the present invention, when an RACH or an SRS is transmitted in an uplink subframe used for communication between the eNB and the RN, the eNB may schedule the RACH or SRS transmission so as not to affect the operation of the RN. On the assumption that the RN communicates in a different RB, the RACH may not affect the operation of the RN. On the other hand, Rel 8 UEs may be scheduled to periodically (e.g. every 10 ms) transmit SRSs. If the transmission period of SRSs is not 10 ms, the SRSs are transmitted during a time period for communication between the RN and the eNB, thereby causing a transmission failure or an SRS confirmation ambiguity.

To solve this problem, SRS scheduling may be considered in many ways.

Firstly, communication may be conducted on the assumption that a preset transmission period of an SRS is known to both an eNB and an RN and the present transmission period of an SRS is not changed. Secondly, the eNB may notify the RN whether an SRS exists in a backhaul uplink subframe used by the RN. Thirdly, an SRS may be utilized as a GT on the assumption of the existence of the SRS in a backhaul uplink subframe used by the RN.

Now, a description will be given of a method for preventing signal interference between an RN and a UE in a system where RNs and UEs are co-existent.

Figure 8:
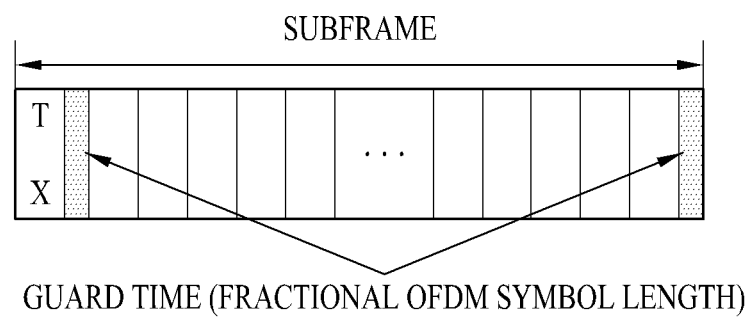
FIG. 8 illustrates exemplary downlink subframe structures according to an embodiment of the present invention.
Figure 8:
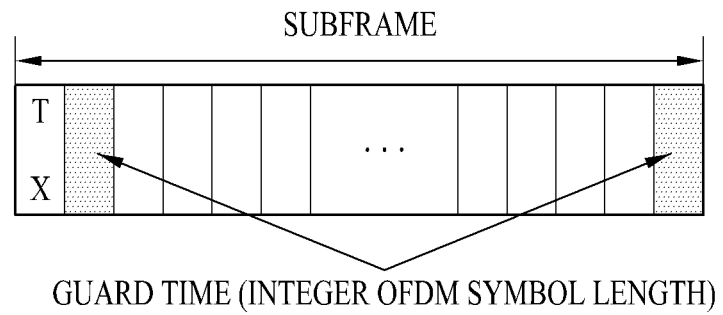

FIG. 8 illustrates exemplary downlink subframe structures according to an embodiment of the present invention, specifically exemplary downlink subframe structures used for communication between an RN and an eNB.

Because the RN should transmit a PDCCH at the start of a downlink subframe to UEs within its serving cell, it can transmit a corresponding PCFICH, PHICH, and PDCCH. The length of control channels may be determined according to the capability of the RN such as the number of antennas. As illustrated in FIG. 8, one OFDM symbol may be allocated to the control channels.

Since the RN should perform both transmission and reception in one subframe, it should transition to the reception mode after transmitting a PDCCH completely in the transmission mode. A GT is required for the mode switching. When the RN receives downlink OFDM symbols from the eNB in the reception mode and then transitions to the transmission mode in the last symbol of the subframe, it needs another GT.

Referring to FIG. 8(a), a fractional OFDM symbol (e.g. a 0.5 OFDM symbol), not an integer number of OFDM symbols may be allocated to a GT in order to maximize the number of downlink OFDM symbols that the RN can receive from the eNB in a subframe structure used by the RN.

In the case where a GT is a fractional OFDM symbol, the boundaries of OFDM symbols in a subframe transmitted from the eNB to the RN may or may not be aligned with the boundaries of OFDM symbols carrying a downlink signal from the eNB to the macrocell.

When the OFDM symbol boundaries are aligned, the downlink is not aligned between the RN and the eNB. Thus, a multipoint transmission scheme cannot be implemented on the downlink.

On the other hand, if an OFDM symbol boundary in a signal transmitted from the eNB to the RN is aligned with an OFDM symbol boundary in a macrocell downlink signal, the downlink can be aligned between the RN and the macro eNB, thereby making multipoint transmission possible. However, a signal delivered in the OFDM symbols transmitted from the eNB to the RN may interfere with a signal that macro UEs receive from the eNB, or vice versa.

Therefore, a GB needs to be added between a resource region in which the eNB transmits a downlink signal to the RN and a resource region in which the eNB transmits a downlink signal to UEs within the macrocell according to another embodiment of the present invention. The GB refers to a transition time gap inserted between resource regions in the frequency domain to mitigate interference between them.

Or an integer number of OFDM symbols (e.g. one OFDM symbol) may be allocated as a GT for switching between the transmission mode and the reception mode, as illustrated in FIG. 8(b).

If a GT occupies an integer number of OFDM symbols, downlink subframes of the eNB and the RN may be aligned with each other, when they are transmitted to UEs. In addition, OFDM symbols transmitted from the eNB to the RN may be aligned with OFDM symbols transmitted from the eNB to UEs within the macrocell. In this case, a relatively large resource region is used as a GB, compared to FIG. 8(a).

Figure 9:
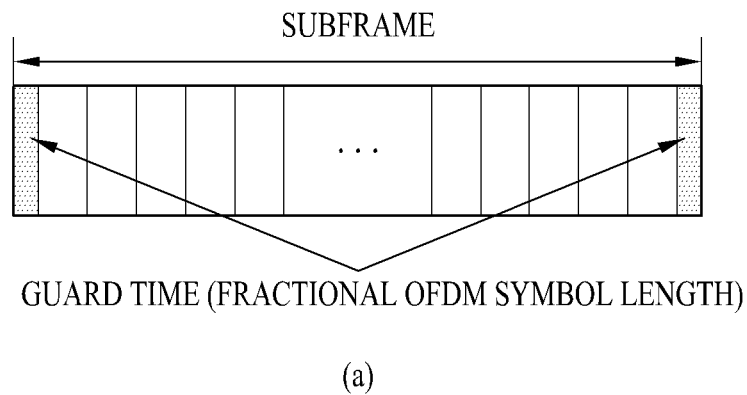
FIG. 9 illustrates exemplary uplink subframe structures according to an embodiment of the present invention.
Figure 9:
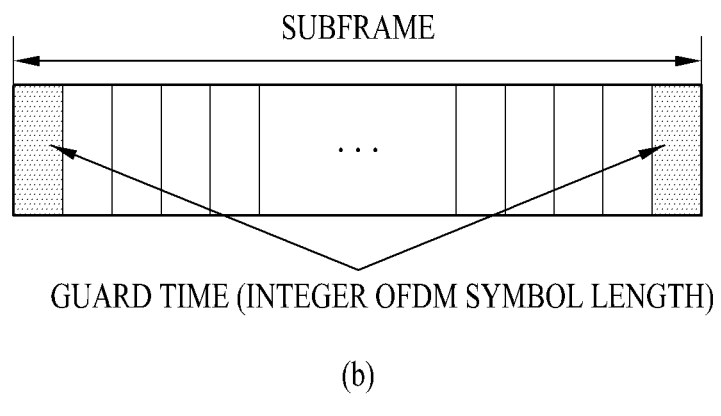
Figure 9:
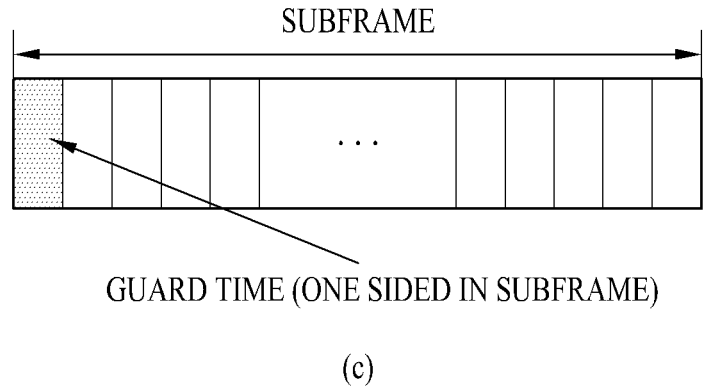

FIG. 9 illustrates exemplary uplink subframe structures according to an embodiment of the present invention, specifically exemplary uplink subframe structures that an RN uses to communicate with an eNB.

Like a downlink subframe, the RN should transition from the reception mode to the transmission mode at the start of a subframe after receiving an uplink signal from served UEs. Therefore, a GT may be inserted at the time of mode switching. After transmitting a signal in as many RBs as the number of SC-FDMA symbols preset between the eNB and the RN, the RN should transition from the reception mode to the transmission mode in the last symbol of the subframe. Thus, another GT may be set in the last SC-FDMA symbol of the corresponding subframe.

If the timing of an uplink subframe used in the relay cell is aligned with the timing of an uplink subframe used in the macrocell, joint processing may be performed between the RN and the eNB using a multipoint transmission scheme.

On the other hand, if the uplink subframes used in the relay cell and the macrocell are different in timing, the transmission timing of the uplink subframe used in the relay cell may be set arbitrarily. As the eNB configures SC-FDMA symbols used for signal transmission in an uplink subframe transmitted from the RN to the eNB in such a manner that these SC-FDMA symbols are aligned with SC-FDMA symbols used for signal transmission from other macro UEs in terms of transmission timing, the overall uplink timing of the relay cell may be set.

Referring to FIG. 9, various methods may be proposed according to an embodiment of the present invention, in which an eNB sets an uplink timing by inserting a GT into an uplink subframe. For example, a fractional OFDM symbol length may be set as an uplink GT, as illustrated in FIG. 9(*a*). That is, a 0.5 SC-FDMA symbol at each of the start and end of the uplink subframe may be allocated as a GT. Or an integer multiple of symbols (e.g. one SC-FDMA symbol) may be set as a GT, as illustrated in FIG. 9(*b*). Herein, the integer includes 0.

Or a GT may be defined at the start or end of a subframe. As illustrated in FIG. 9(*c*), if a GT is defined at the start of a subframe, the RN may transmit an uplink signal to the eNB in a maximum number of OFDM symbols. If a GT is defined at the end of the subframe and an SRS exits in the subframe, a symbol carrying the SRS may be used as a GT.

On the assumption that each uplink subframe includes an SRS, the first and last symbols of the subframe may be used as GTs, as illustrated in FIG. 9(*b*).

Figure 10:
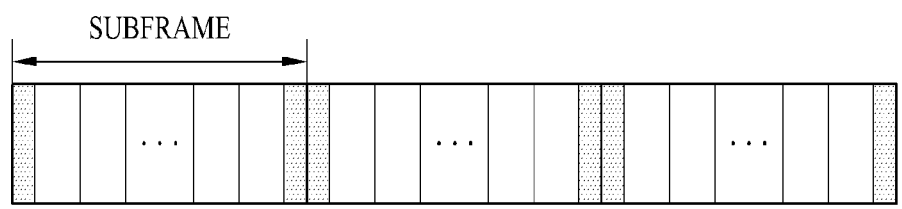
FIGS. 10 and 11 illustrate exemplary uplink subframe structures according to an embodiment of the present invention.
Figure 10:
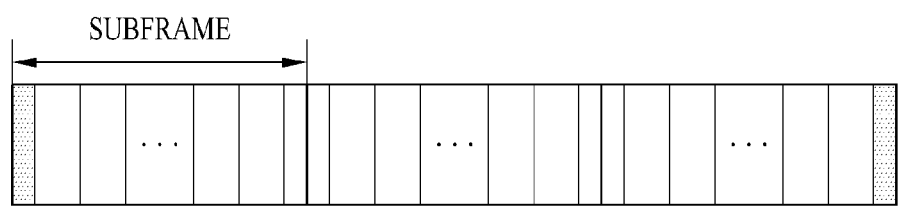
Figure 11:
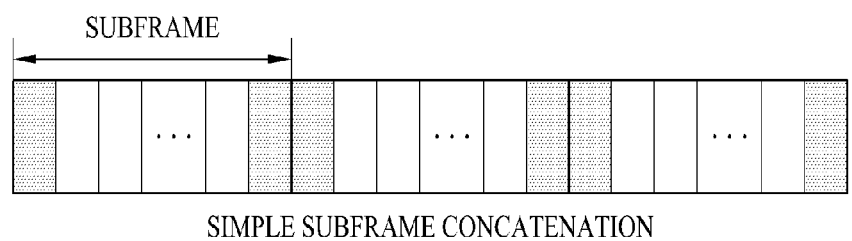
Figure 11:
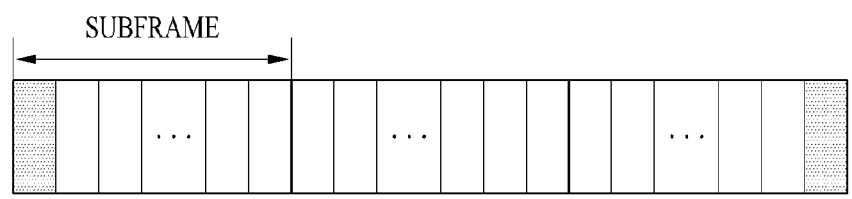
Figure 11:
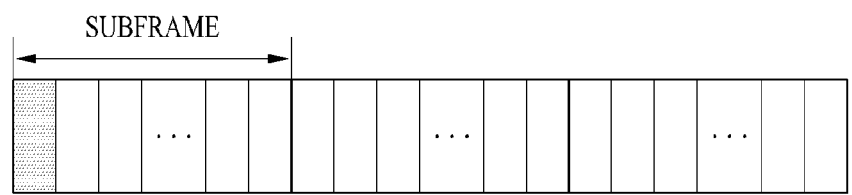

FIGS. 10 and 11 illustrate exemplary uplink subframe structures according to an embodiment of the present invention, specifically examples of concatenated uplink subframes for communication between an RN and an eNB.

FIG. 10 illustrates a subframe group of three concatenated subframes with a fractional SC-FDMA symbol length as a GT and FIG. 11 illustrates a subframe group of three concatenated subframes with an integer SC-FDMA symbol length as a GT.

While FIGS. 10 and 11 illustrate a subframe group of three concatenated subframes as an example for describing the present invention, to which the present invention is not limited, a subframe group may be configured with an arbitrary number of subframes. When a subframe group is configured, a predetermined number of subframes may be concatenated in the subframe group.

When successive subframes are allocated, the RN may determine whether to apply a GT depending on whether the transmission mode is to be switched. Since the RN does not need to switch from the transmission mode to the reception mode in the concatenated uplink subframes allocated to the RN, a GT may not be allocated in the middle subframe, as illustrated in FIGS. 10(*b*) and 11(*b*).

Or a GT may be allocated to either of the start and end of the subframe group with concatenated subframes, as illustrated in FIG. 11(*c*).

Figure 12:
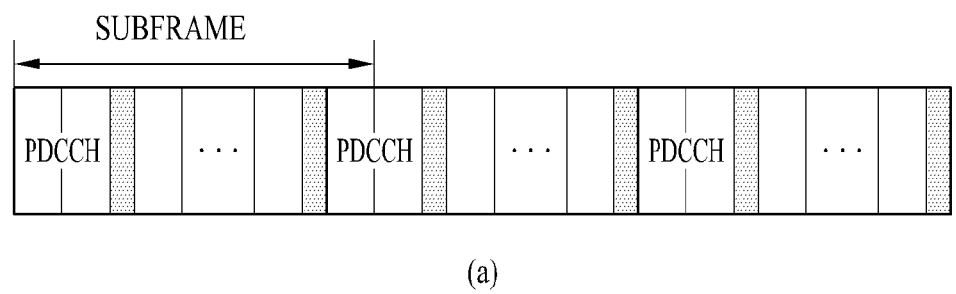
FIG. 12 illustrates exemplary downlink subframes structure according to an embodiment of the present invention.
Figure 12:
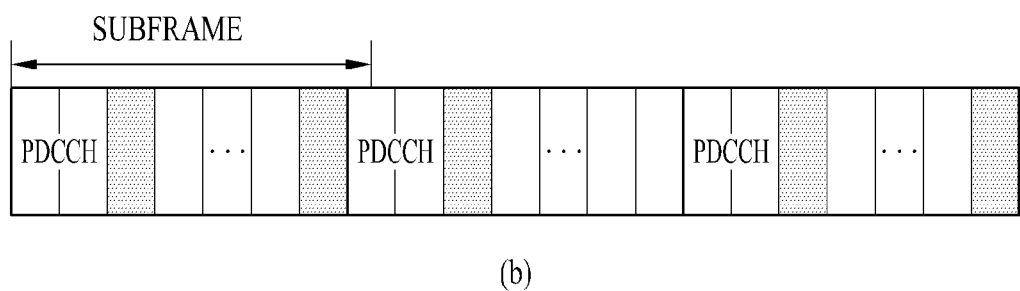

FIG. 12 illustrates exemplary downlink subframe structures according to an embodiment of the present invention, specifically exemplary structures of concatenated downlink subframes for communication between an RN and an eNB.

As described before, when a specific region is allocated to control channels in a downlink subframe, a GT is needed to distinguish regions carrying data/control information to a UE and an RN from each other in the control channel region. In addition, a fraction of the last symbol or one or more last symbols of a corresponding downlink subframe are allocated as a GT. Therefore, a concatenated subframe structure may be configured by allocating a fractional OFDM symbol length as a GT as illustrated in FIG. 12(*a*) or by allocating an integer OFDM symbol length as a GT as illustrated in FIG. 12(*b*).

If the boundary of an SC-FDMA symbol in an uplink subframe carrying a signal from the RN to the eNB is not aligned with the boundary of an SC-FDMA symbol in an uplink subframe carrying a signal from a macro UE to the eNB, a GB may be inserted between a resource region used by a first RN and a resource region used by a second RN.

Figure 13:
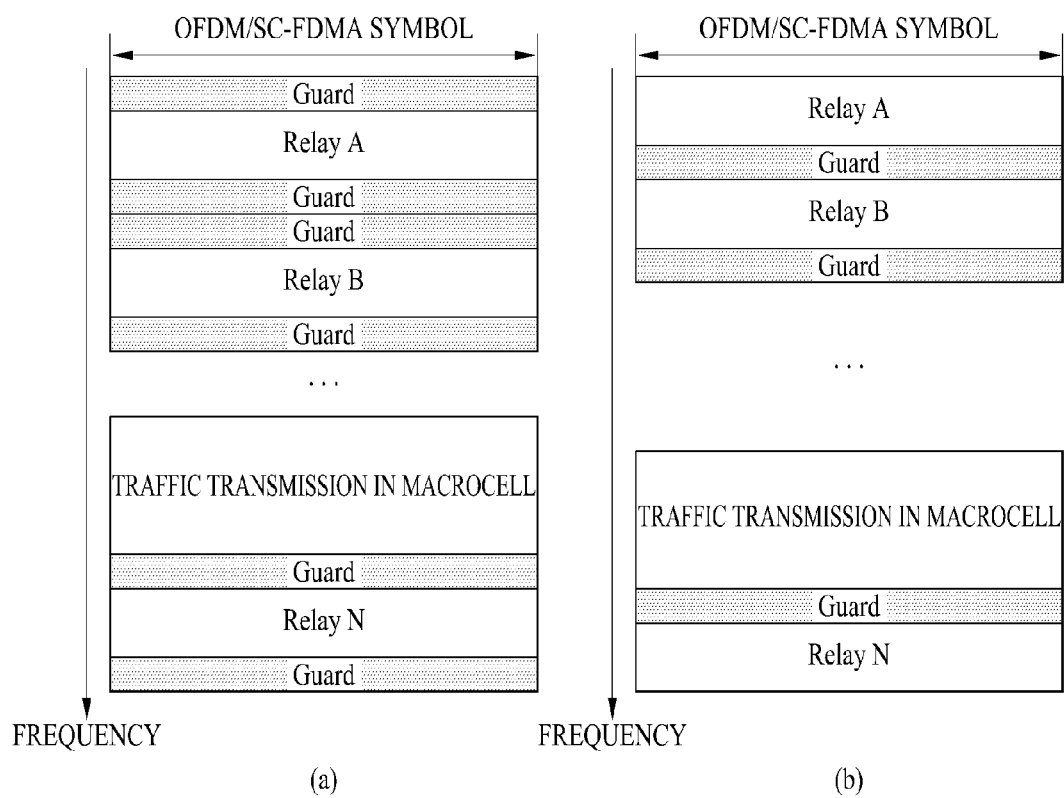
FIGS. 13, 14 and 15 illustrate exemplary cases of setting a guard band in a resource region used for communication between an eNB and an RN according to an embodiment of the present invention.
Figure 14:
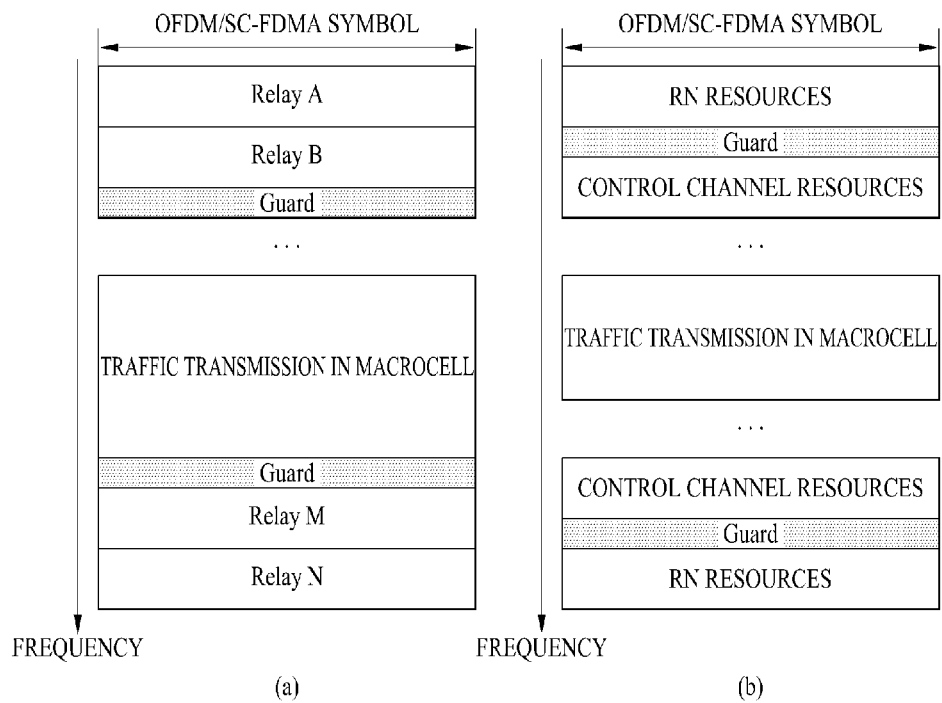
Figure 15:
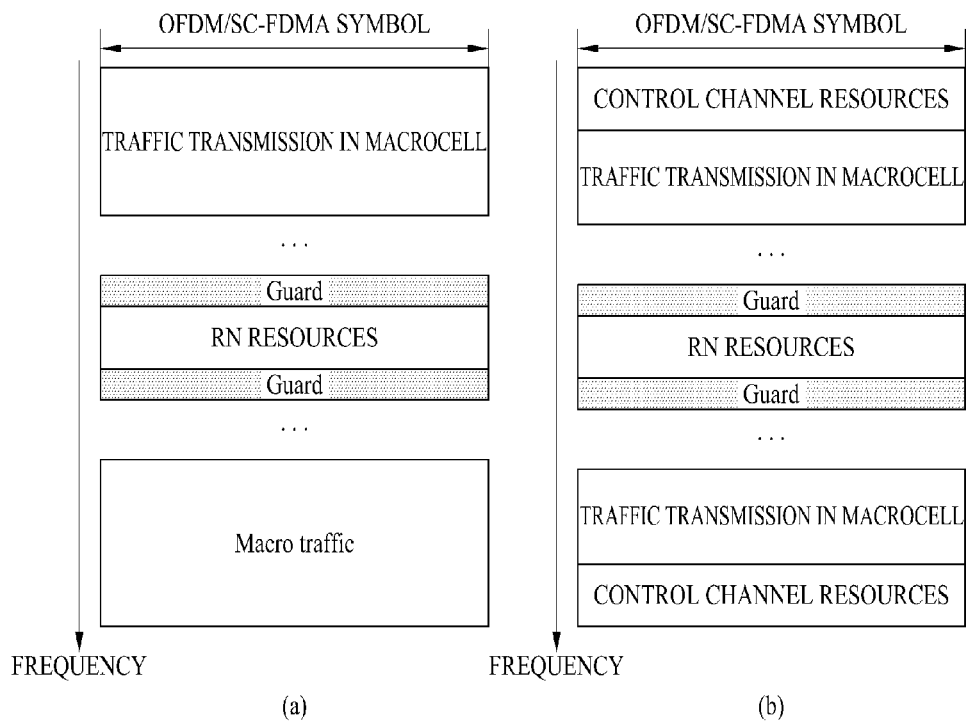

FIGS. 13, 14 and 15 illustrate exemplary cases of setting a GB in a resource region used for communication between an eNB and an RN according to an embodiment of the present invention. The illustrated resource region includes a downlink resource region for transmitting a signal to a macrocell by an eNB and an uplink resource region for transmitting an uplink signal to the eNB by an RN.

In accordance with an embodiment of the present invention, GBs may be set at the start and end of each specific resource region which each RN uses for signal transmission and reception, as illustrated in FIG. 13(*a*). In this case, two GBs may be successively inserted at the boundary between a resource region for Relay A and a resource region for Relay B. To extend an available resource region for use in transmitting a downlink signal to the macrocell by the eNB, one GB may be inserted at the boundary between resources regions of RNs, as illustrated in FIG. 13(*b*).

Or if RNs are synchronous to each other through timing control, GBs may be set at both ends of the overall resource region of a plurality of RNs without setting a GB between successive relay resource regions. If the resource region of a plurality of RNs is located at an end of an available system bandwidth, no GB may be set at either of the ends of the system bandwidth as illustrated in FIG. 14(*a*). Therefore, a minimum resource region is allocated to a GB, thereby efficiently using subcarriers.

FIG. 14(*b*) illustrates another embodiment in which GBs are configured at both ends of an available system bandwidth. On the uplink, control channel resource regions and traffic resource regions may be successively allocated in the available system bandwidth and resource regions for RNs may be allocated at both ends of the available system bandwidth. The RN resource regions are for a plurality of RNs and GBs may be inserted only at the boundaries between the RN resource regions and other resource regions.

Or a specific resource region for a plurality of RNs may be allocated inside the available system bandwidth and GBs may be configured at both ends of the RN resource region, as illustrated in FIGS. 15(*a*) and 15(*b*).

In this manner, interference can be minimized during switching from the transmission mode to the reception mode and from the reception mode to the transmission mode at an RN, while the RN is wirelessly communicating with an eNB according to the embodiments of the present invention. Since the RN can find out the number of OFDM symbols or SC-FDMA symbols allocated to a GB in a subframe, it can operate without affecting UEs in a legacy system.

Figure 16:
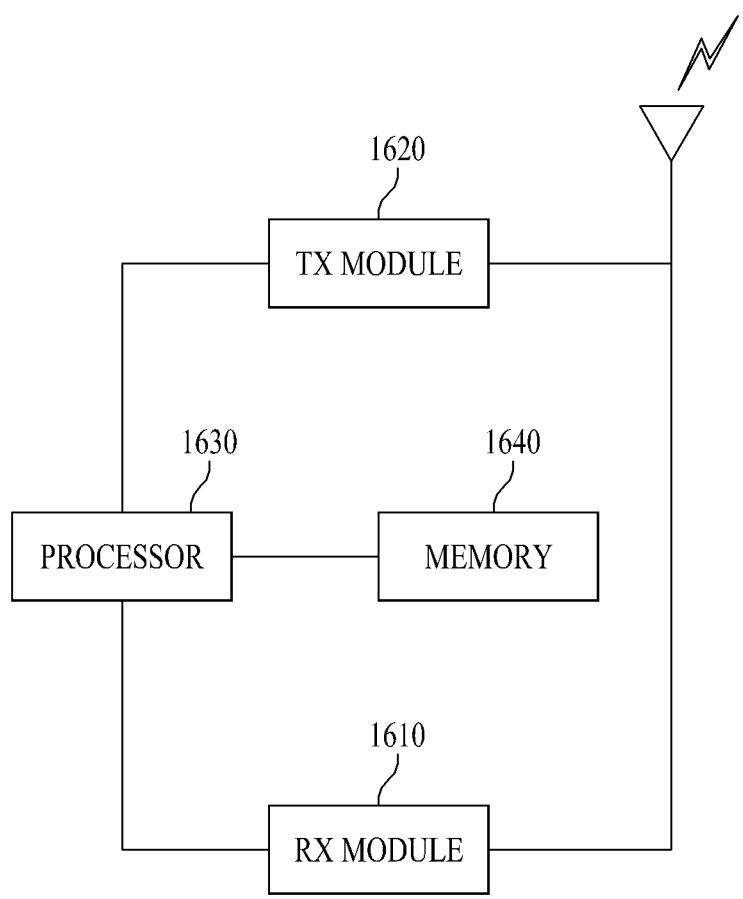
FIG. 16 is a block diagram illustrating a preferred structure of an RN apparatus according to an embodiment of the present invention.

FIG. 16 is a block diagram illustrating a preferred structure of an RN apparatus according to an embodiment of the present invention.

Referring to FIG. 16, the RN includes a Reception (Rx) module 1610, a Transmission (Tx) module 1620, a processor 1630, and a memory 1640.

The Rx module 1610 of the RN may receive control information, data, and signals from an eNB and a UE. Especially, the Rx module 1610 may receive control information from the eNB during a specific OFDM symbol period of a subframe configured according to the embodiments of the present invention described before with reference to FIGS. 3 to 15. Or, the Rx module 1610 may receive a signal from the UE during a specific OFDM symbol period of a subframe other than the specific subframe. A fractional OFDM symbol length may be allocated as a GT to mitigate interference at the time of switching between a transmission operation and a reception operation of the RN in a subframe available to the RN.

The Tx module 1620 may transmit control information, data, and signals to the eNB and the UE. The Tx module 1620 may transmit control information to the eNB during a specific SC-FDMA symbol period of a subframe configured according to the embodiments of the present invention described before with reference to FIGS. 3 to 15. Or, the Tx module 1620 may transmit a signal to the UE during a specific SC-FDMA symbol period of a subframe other than the specific subframe.

In addition, GBs may be set at both ends of a resource region in which the Rx module 1610 and the Tx module 1620 receive or transmit signals in order to minimize interference with another resource region.

The processor 1630 may process signals and information received at the RN or signals and information to be transmitted from the RN.

The memory 1640 may store information processed by the processor 1630 or information received at the Rx module 1610 for a specific time period. The memory 1640 may be replaced with a component such as a buffer (not shown).

The embodiments of the present invention may be achieved by various means, for example, hardware, firmware, software, or a combination thereof. In a hardware configuration, the control information transmission and reception method according to an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention is applicable to various wireless communication systems. The various wireless communication systems include, for example, 3GPP, 3GPP2 and/or IEEE 802.xx systems. The embodiments of the present invention are applicable to all technical fields of applications of the various wireless access systems as well as the various wireless access systems.

The invention claimed is:

1. A method for transmitting and receiving a signal in a downlink subframe at a relay in a wireless communication system, the method comprising:
transmitting, by the relay, a first Physical Downlink Control CHannel (PDCCH) in a downlink subframe to User Equipments (UEs) within a relay cell; and
receiving, by the relay, a second PDCCH or a Physical Downlink Shared CHannel (PDSCH) from a Base Station (BS) after a first guard time following the first PDCCH,
wherein a second guard time is allocated after the second PDCCH or the PDSCH received from the BS in the downlink subframe and the relay receives the second PDCCH in a first predetermined number of symbols according to specific control channel region information received from the BS, and
wherein the first PDCCH is transmitted after the sum of a time corresponding to a propagation delay from the start of the downlink subframe and a time corresponding to a specific number of symbols.

2. The method according to claim 1, wherein if the specific control channel region information includes information about a maximum or minimum length of the second PDCCH transmitted by the BS, the relay transmits and receives a signal in remaining symbols except for the first predetermined number of symbols indicated by the specific control channel region information.

3. The method according to claim 1, wherein the specific control channel region information includes information about a fixed region length set by the BS.

4. The method according to claim 1, wherein the specific channel region information is set by the BS and received in an arbitrary downlink subframe ahead of the downlink subframe in which the relay receives the second PDCCH from the BS.

5. The method according to claim 1, wherein each of the first and second guard times is a 0.5 symbol or one or more symbols.

6. The method according to claim 1, wherein a second predetermined number of symbols are set as a guard band to distinguish a relay resource region used for the relay to transmit and receive the first PDCCH, the second PDCCH, and the PDSCH from a BS resource region used for the BS to transmit a downlink signal to UEs within a cell in a total system resource region.

7. The method according to claim 6, wherein the guard band is a symbol at least one of both ends of the relay resource region.

8. The method according to claim 6, wherein if the relay resource region is divided into resource regions for a plurality of relays, the relay resource region further includes a plurality of guard bands to distinguish the resource regions for the plurality of relays from one another.

9. A relay for transmitting and receiving a signal in a downlink subframe in a wireless communication, the relay comprising:
a reception module for receiving a radio signal in a downlink subframe;
a transmission module for transmitting a first Physical Downlink Control CHannel (PDCCH) in the downlink subframe to User Equipments (UEs) within a relay cell; and
a processor for receiving a second PDCCH or a Physical Downlink Shared CHannel (PDSCH) from a Base Station (BS) through the reception module after a first guard time following the first PDCCH,
wherein the processor allocates a second guard time after the second PDCCH or the PDSCH received from the BS in the downlink subframe and receives the second PDCCH in a first predetermined number of symbols through the reception module according to specific control channel region information received from the BS, and
wherein the reception module is configured to receive the first PDCCH after the sum of a time corresponding to a propagation delay from the start of the downlink subframe and a time corresponding to a specific number of symbols.

10. The relay according to claim 9, wherein if the specific control channel region information includes information about a maximum or minimum length of the second PDCCH transmitted by the BS, the processor transmits and receives a signal in remaining symbols except for the first predetermined number of symbols indicated by the specific control channel region information, through the transmission module and the reception module.

11. The relay according to claim 9, wherein the specific control channel region information includes information about a fixed region length set by the BS.

12. The relay according to claim 9, wherein the specific channel region information is set by the BS and the reception module receives the specific channel region information in an arbitrary downlink subframe ahead of the downlink subframe in which the reception module receives the second PDCCH from the BS.

13. The relay according to claim 9, wherein each of the first and second guard times is a 0.5 symbol or one or more symbols.

14. The relay according to claim 9, wherein the processor sets a second predetermined number of symbols as a guard band to distinguish a relay resource region used for the relay to transmit and receive the first PDCCH, the second PDCCH, and the PDSCH from a BS resource region used for the BS to transmit a downlink signal to UEs within a cell in a total system resource region.

15. The relay according to claim 14, wherein the guard band is a symbol at least one of both ends of the relay resource region.

16. The relay according to claim 14, wherein if the relay resource region is divided into resource regions for a plurality of relays, the processor further sets a plurality of guard bands to distinguish the resource regions for the plurality of relays from one another.

\* \* \* \* \*